(12) United States Patent
Bugnano et al.

(10) Patent No.: US 9,398,827 B2
(45) Date of Patent: *Jul. 26, 2016

(54) DELIVERY ASSEMBLY AND METHOD FOR PREPARING LIQUID PRODUCTS VIA CARTRIDGES

(71) Applicant: LUIGI LAVAZZA S.P.A., Turin (IT)

(72) Inventors: Luca Bugnano, Turin (IT); Alberto Cabilli, Turin (IT)

(73) Assignee: LUIGI LAVAZZA S.P.A., Turin (IT)

( * ) Notice: Subject to any disclaimer, the term of this patent is extended or adjusted under 35 U.S.C. 154(b) by 0 days.

This patent is subject to a terminal disclaimer.

(21) Appl. No.: 14/386,569

(22) PCT Filed: Feb. 26, 2013

(86) PCT No.: PCT/IB2013/051543
§ 371 (c)(1),
(2) Date: Sep. 19, 2014

(87) PCT Pub. No.: WO2013/140282
PCT Pub. Date: Sep. 26, 2013

(65) Prior Publication Data
US 2015/0072057 A1    Mar. 12, 2015

(30) Foreign Application Priority Data
Mar. 20, 2012    (IT) .............................. TO2012A0249

(51) Int. Cl.
| A47J 31/40 | (2006.01) |
| A23F 3/18 | (2006.01) |
| A47J 31/36 | (2006.01) |
| A23F 5/26 | (2006.01) |
| A23L 2/52 | (2006.01) |

(52) U.S. Cl.
CPC .................. *A47J 31/407* (2013.01); *A23F 3/18* (2013.01); *A23F 5/262* (2013.01); *A23L 2/52* (2013.01); *A47J 31/3633* (2013.01); *A47J 31/3638* (2013.01); *A23V 2002/00* (2013.01)

(58) Field of Classification Search
CPC . A47J 31/407; A47J 31/3633; A47J 31/3638; A23F 3/18; A23F 5/262; A23L 2/52; A23V 2002/00
See application file for complete search history.

(56) References Cited

U.S. PATENT DOCUMENTS 5,197,374 A  *  3/1993  Fond ............................... 99/295
6,955,116 B2 * 10/2005  Hale ............................... 99/295
(Continued)

FOREIGN PATENT DOCUMENTS

| FR | 2 713 905 | 6/1995 |
| WO | WO 2008/096385 | 8/2008 |
| WO | WO 2010/032271 | 3/2010 |

OTHER PUBLICATIONS

International Search Report for PCT/IB2013/051543 mailed May 27, 2013.
(Continued)

*Primary Examiner* — Anthony Weier
(74) *Attorney, Agent, or Firm* — Nixon & Vanderhye P.C.

(57) ABSTRACT

A delivery assembly for a machine for preparing liquids product by means of cartridges includes:
  an injector device, to let water and/or steam under pressure in the cartridge,
  an infusion chamber, facing the injector device and capable of receiving one said cartridge,
  retention element, capable of maintaining the cartridge in a position substantially coaxial to the infusion chamber and the injector device. The retention elements having:
  a support element of the cartridge, sustained in a displaceable way by the injector device in a part thereof that generally faces towards the outlet passage; and
  guiding elements mounted in a fixed position at generally opposite side parts of the injector device, that frontally protrude from the injector device and are capable of laterally constraining the cartridge to guide it until a position substantially coaxial to the infusion chamber.

14 Claims, 8 Drawing Sheets

(56) References Cited

U.S. PATENT DOCUMENTS 7,063,238 B2 * 6/2006 Hale .............................. 222/325
2007/0202237 A1 * 8/2007 Yoakim et al. ................ 426/590

OTHER PUBLICATIONS

Written Opinion of the International Searching Authority for PCT/IB2013/051543 mailed May 27, 2013.

* cited by examiner

DELIVERY ASSEMBLY AND METHOD FOR PREPARING LIQUID PRODUCTS VIA CARTRIDGES

This application is the U.S. national phase of International Application No. PCT/IB2013/051543 filed 26 Feb. 2013 which designated the U.S. and claims priority to IT TO2012A000249 filed 20 Mar. 2012, the entire contents of each of which are hereby incorporated by reference.

TECHNICAL FIELD

The present description relates to machines, systems and methods for the preparation of liquid products by means of cartridges and has been developed with particular reference to delivery assemblies for said machines.

TECHNOLOGICAL BACKGROUND

WO 2006/005736 describes a coffee-making machine having a delivery assembly including an injector, for injecting hot water under pressure into a cartridge, and an infusion chamber, for receiving the cartridge and for release of the liquid product, where the injector and the chamber are coaxial to a horizontal axis of the assembly, with the chamber that is movable with respect to the injector. The cartridge is introduced into the delivery assembly from above, by means of a loading arrangement that comprises an upper inlet duct, underneath which means for retention of the cartridge are operative. The aforesaid retention means are constituted by a stationary gripper device, which includes two symmetrically opposite jaws, set transverse to the aforesaid horizontal axis in an area comprised between the chamber and the injector. The jaws are hinged, at the respective upper ends, to pins parallel to the aforesaid axis in order to swing between a condition of retention and a condition of release of the cartridge, against the action of a spring. The jaws are shaped so as to define between them an upper funnel-shaped housing and a substantially cylindrical lower seat, coaxial to the aforesaid axis.

In use, a cartridge is inserted in the inlet duct, until it enters the aforesaid funnel-shaped housing, and then pushed with an energy sufficient to cause divarication of the jaws, with the consequent passage of the cartridge into the underlying cylindrical seat, where the cartridge is withheld by the jaws by means of the action of the corresponding springs. Next, the infusion chamber, in the course of its own advance towards the injector, engages the bottom part of the jaws, causing divarication thereof and thus making possible passage of the cartridge within the chamber.

After the step of preparation and dispensing of the liquid product, the chamber moves back towards its initial position so as to enable reclosing of the jaws on the exhausted cartridge. The exhausted cartridge is in this way extracted from the chamber and again withheld between the jaws at the end of cycle. Next, when a user introduces into the inlet duct a new cartridge, the thrust exerted downwards on the latter causes divarication of the jaws, thereby enabling dropping of the exhausted cartridge towards a discharge passage of the assembly.

In the solution described in WO 2006/005736, the stationary gripper device including the jaws is relatively cumbersome. Supply of the cartridges is relatively inconvenient in so far as it requires the user to exert a push downwards, such as to cause divarication of the jaws. A substantial disadvantage of this type of solution is represented by the fact that removal from the assembly of an exhausted cartridge implies that in the assembly itself a new cartridge is inserted. The solution hence proves disadvantageous from the hygienic standpoint, in particular when the machine is not used for a certain period of time. Within an exhausted cartridge there remain in fact both the substance used for the infusion and residue of water, which with the passage of time can give rise to bad odours or to moulds.

In order to overcome said drawback, delivery assemblies have been proposed in which the means for retention of the cartridge are configured for performing also a function of extraction of the exhausted cartridge from the infusion chamber, in the course of a movement of recession between the injector device and the infusion chamber.

For example, EP-A-2046170 describes a delivery assembly in which the infusion chamber can be translated linearly with respect to the injector, and the latter laterally supports two opposite jaws, which are able to assume a closed position and an open position. When the injector is in a position spaced from the chamber, the jaws are forced elastically into a closed condition in order to be able to receive in a purposely provided seat thereof a peripheral flange of the cartridge, and thus support the cartridge itself. Next, in the course of advance of the chamber towards the injector, a front inclined surface of the jaws interacts with an inclined surface defined in the body of the injector in such a way as to cause divarication of the jaws, and thus disengagement of the cartridge from the aforesaid seat, when the cartridge is already partially introduced into the infusion chamber. After dispensing of the beverage, recession of the infusion chamber with respect to the injector brings about reclosing of the jaws, with a purposely provided extraction portion of said jaws that comes to engage the flange of the cartridge. In this way, in the course of the aforesaid recession, the reclosed jaws determine extraction of the cartridge from the infusion chamber, with the cartridge that can drop by gravity into the discharge passage of the assembly.

Solutions of the same type as the one described in EP-A-2046170, albeit constituting an improvement from the hygienic standpoint as compared to the more traditional known art, are, however, relatively cumbersome and imply—at each dispensing cycle—a significant mechanical interference between the jaws and the injector, with consequent wear of the components and possible misalignments.

Said drawbacks are partially overcome in solutions of the type as the one described in EP-A-2077087, on which the preamble of Claim 1 is based. This document regards a delivery assembly wherein a movable injector has two shafts projecting laterally, each of which is loosely engaged in a slot of a respective lateral jaw, with each jaw that is supported in a movable way by a respective guide member fixed with respect to the stationary structure of the assembly. In this way, the displacement of the injector also brings about displacement of the jaws supported by the corresponding guide members. The jaws are shaped for supporting the cartridge laterally and at the bottom, after this has been inserted from above into the assembly, and each of them has a front peg and a rear peg, substantially perpendicular to the shafts that constrain the jaws themselves to the injector.

As has been said, fixed laterally to the stationary structure of the assembly are two guide members of the jaws. Each guide member comprises a pair of components set on top of one another and in parallel positions, operatively set between which is the respective jaw. The two aforesaid components each have a shaped groove, which defines a substantially closed cam path, engaged in which are the front pin and the rear pin of the respective jaw.

Also in this solution, in the position where the chamber and the injector are set at a distance apart, the jaws are in a closed position or close to one another, to receive and support the cartridge. The cam path has a forward stretch configured in such a way that, in the course of approach of the injector to the chamber, the jaws open only after the cartridge has been almost completely inserted in the infusion chamber. After dispensing of the liquid product, in the course of recession of the injector, the jaws reclose, and a spring inside the infusion chamber forces the cartridge to come out of the chamber, with the cartridge that is supported by a bottom portion of the jaws, purposely shaped. In the course of recession of the injector, the front pin of each jaw is forced to engage a return stretch of the cam paths, which, at a certain point, brings about divarication of the jaws so as to enable dropping of the cartridge by gravity into the discharge passage of the assembly. Solutions of this type are also described in CN-A-101073470 and CN-Y-201044719.

Consequently, in this solution, in the course of a dispensing cycle, the jaws pass twice from a closed, or retention, condition to an open, or release, condition and precisely a first time practically at the end of advance of the injector towards the infusion chamber, and a second time in the course of recession of the injector towards the starting position. At the moment of the first opening, the cartridge is almost completely inserted into the infusion chamber, whereas upon second opening the cartridge is free to drop by gravity into the discharge passage of the assembly. Said function is allowed by the presence of cam paths of a substantially closed or non-reversible type, i.e., devised in such a way that the front pins of the jaws describe, in the course of recession of the injector from the infusion chamber, a stretch of path different from the one that they had followed in the course of approach of the injector to the chamber.

Also in this type of solutions, the system with jaws is cumbersome and constructionally complicated, in view of the need to envisage the aforesaid non-reversible cam paths, defined in the corresponding components that support the jaws. Said jaws are relatively cumbersome, on account of their particular conformation. The system is moreover potentially subject to jamming.

OBJECT AND SUMMARY

In its general terms, the aim of the present invention is to provide an improved and compact delivery assembly that is simple from the constructional and functional standpoint, as well as convenient to use for a user, as compared to the known solutions referred to above.

According to the invention, the aforesaid aim is achieved thanks to a delivery assembly for machines for the preparation of liquid products using cartridges having the characteristics recalled in Claim 1. The invention also relates to a system and a method for the preparation of liquid products. Advantageous developments of the invention form the subject of the dependent claims. The claims form an integral part of the technical teaching provided herein in relation to the invention.

BRIEF DESCRIPTION OF THE DRAWINGS

The invention will now be described, purely by way of non-limiting example, with reference to the annexed drawings, in which.

DETAILED DESCRIPTION

Illustrated in the ensuing description are various specific details aimed at providing an in-depth understanding of the embodiments. The embodiments can be obtained without one or more of the specific details, or with other methods, components, materials, etc. In other cases, structures, materials, or operations that are known by or evident for the person skilled in the sector are not illustrated or described in detail so that the various aspects of the embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" and the like that may be present in various points of the present description do not necessarily refer to one and the same embodiment. Moreover, particular conformations, structures or characteristics may be combined in any adequate way in one or more embodiments.

The references used herein are provided merely for convenience and hence do not define the sphere of protection or the scope of the embodiments.

Figure 1:
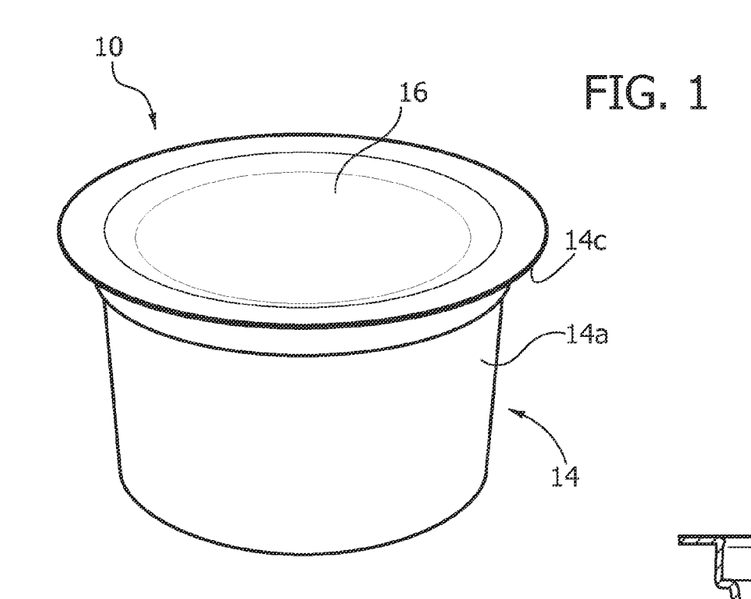
FIGS. 1 and 2 are a perspective view and a cross-sectional view, respectively, of a generic cartridge that can be used in a delivery assembly according to the present invention.
Figure 2:
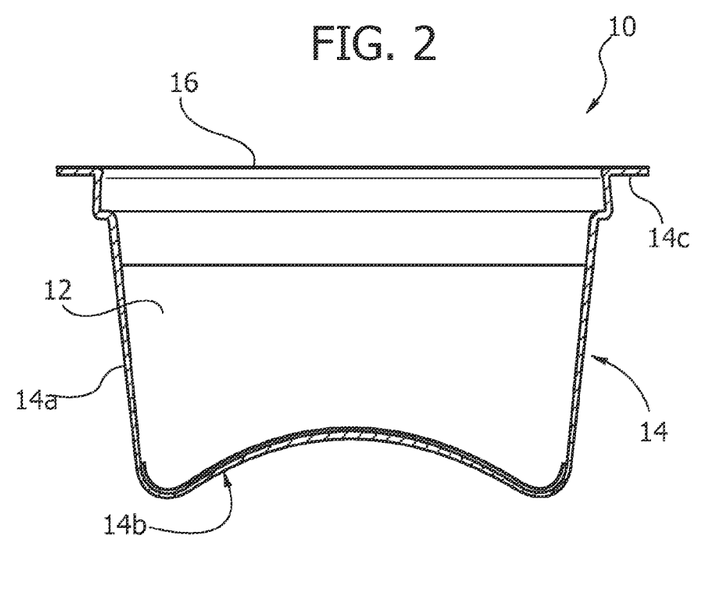

FIGS. 1 and 2 illustrate, merely by way of example, a cartridge that can be used in a machine according to the present invention. Said cartridge, designated as a whole by 10, is of a type basically known and is described herein merely to facilitate understanding of one embodiment of the present invention.

The cartridge 10 contains a dose 12 of at least one substance that can form a liquid product via water and/or steam. The dose 12 can be constituted by powdered coffee, or by another precursor of a liquid product, such as, for example, a beverage, tea, powdered chocolate, or chocolate in granular form, products for the preparation of broths, soups, drinks and infusions of various nature. Said list is to be understood as merely providing a non-imperative example. In what follows, for simplicity, reference will be made to the preparation of coffee, with the dose 12 that is thus understood as being constituted by powdered coffee.

In the structure of the cartridge 10, which is as a whole shaped substantially like a tray or small cup in which the dose 12 is located, there may be distinguished:

- a body 14, comprising a side or peripheral wall 14a and a bottom wall 14b that closes the body 14 at one end of the side wall 14a; and
- a closing wall 16 that closes the cartridge 10 at the opposite end with respect to the bottom wall 14b.

In the example illustrated, the cartridge 10 is a hermetically closed cartridge, with the wall 16 that is constituted by a sealing lamina. The invention can in any case be used also in combination with cartridges in which the bottom wall and/or the closing wall are previously provided with holes.

In the example, the wall or lamina 16 is connected in a fluid-tight way, for example, by heat sealing, to the side wall 14a of the body 14 of the cartridge, in particular at an outer annular flange 14c thereof, which surrounds the mouth part of the body 14. Thus, the cartridge 10 has an asymmetrical shape, with respect to a plane of the flange 14c. Hence, the cartridge 10 has an asymmetrical shape, with respect to a plane passing through the flange 14c.

In the case exemplified, the body 14 is shaped like a cup or tray diverging from the bottom wall 14b towards the end closed by the sealing lamina 16. Preferably, said diverging conformation is frustoconical, even though this is not imperative in so far as the cartridge 10 can as a whole be of different shapes, for example, cylindrical, prismatic, frusto-pyramidal, etc.

In the non-limiting example represented, the bottom wall 14b is shaped like a concave vault, with the concavity of said vault directed towards the outside of the cartridge 10. Also in this case, the choice of said conformation is not imperative in so far as the cartridge 10 could have, for example, a bottom wall 14b shaped like a vault with its concavity facing the inside of the cartridge 10, or else a bottom wall 14b that is plane or substantially plane.

Figure 3:
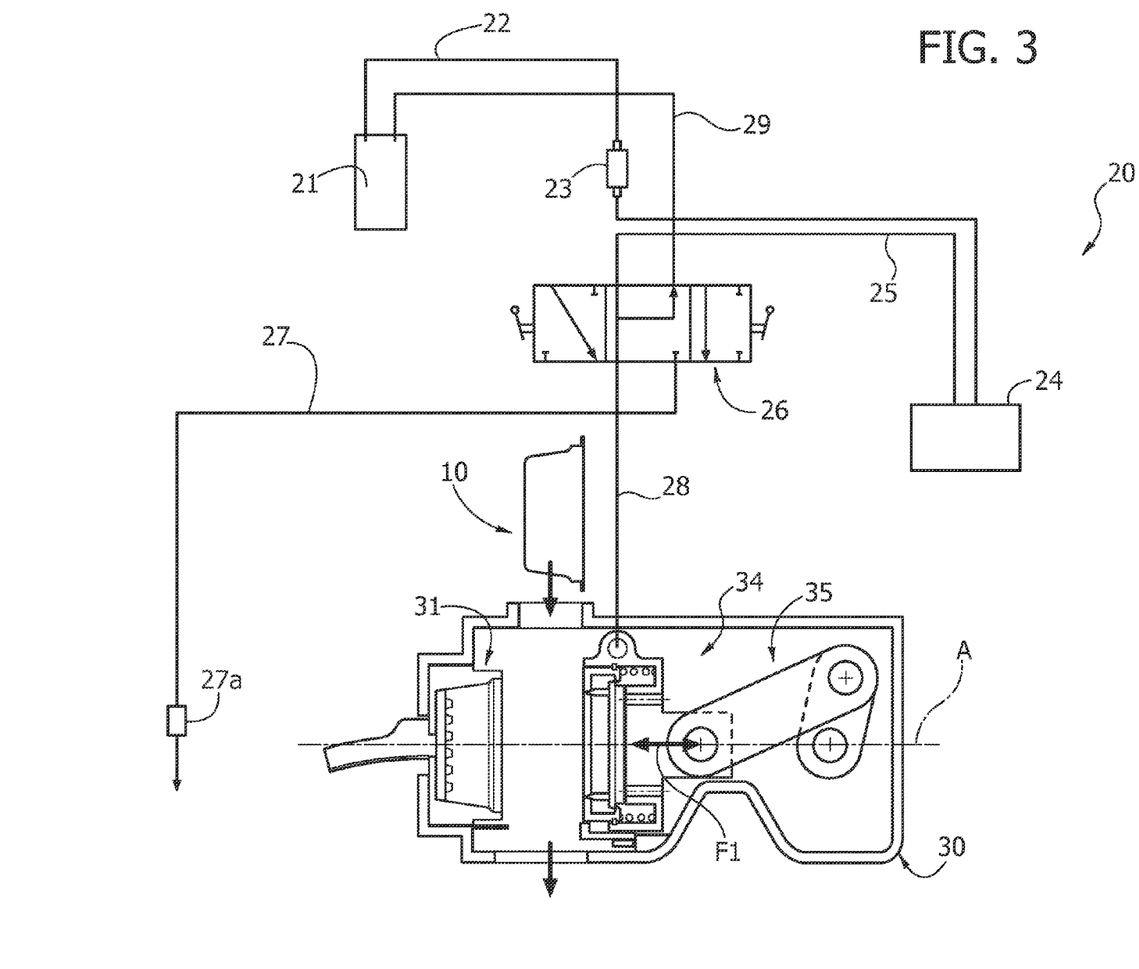
FIG. 3 is a schematic representation, partly in blocks and partly in cross-sectional view, of a possible embodiment of a machine for the preparation of liquid products, including a delivery assembly according to the present invention.

Designated as a whole by 20 in FIG. 3 is a machine for the preparation of liquid products that uses a delivery assembly according to the invention, designed to use a cartridge 10, for example, a cartridge of the type described above with reference to FIGS. 1 and 2.

The machine 20 comprises a reservoir 21 for cold water, with an outlet duct 22, operative on which is a pump 23, of a type in itself known, for example, an electromagnetic pump. Via the duct 22 the reservoir 21 is connected to an inlet of a boiler 24, which is also of a type in itself known. An outlet of the boiler 24 is connected to a duct 25 for supplying hot water and/or steam under pressure to an inlet of a distributor device, for example, a distributor, designated by 26.

When the distributor 26 is in a first operative position (towards the right, as viewed in FIG. 3), it sets the duct 25 in communication with a duct 27 that supplies a nozzle 27a for dispensing hot water and/or steam. When, instead, the distributor 26 is in a second operative position (to the left, as viewed in FIG. 2), the duct 25 is set in fluid communication with a duct 28 for supplying hot water under pressure to a delivery assembly according to the invention, designated as a whole by 30. In various embodiments, the delivery assembly 30 is a horizontal delivery assembly, which extends as a whole according to a horizontal axis A.

Finally, when the distributor 16 is located in an inoperative position (at the centre, as illustrated in FIG. 3), the duct 25 is in fluid communication with a duct 29 for return of water to the reservoir 21.

Figure 4:
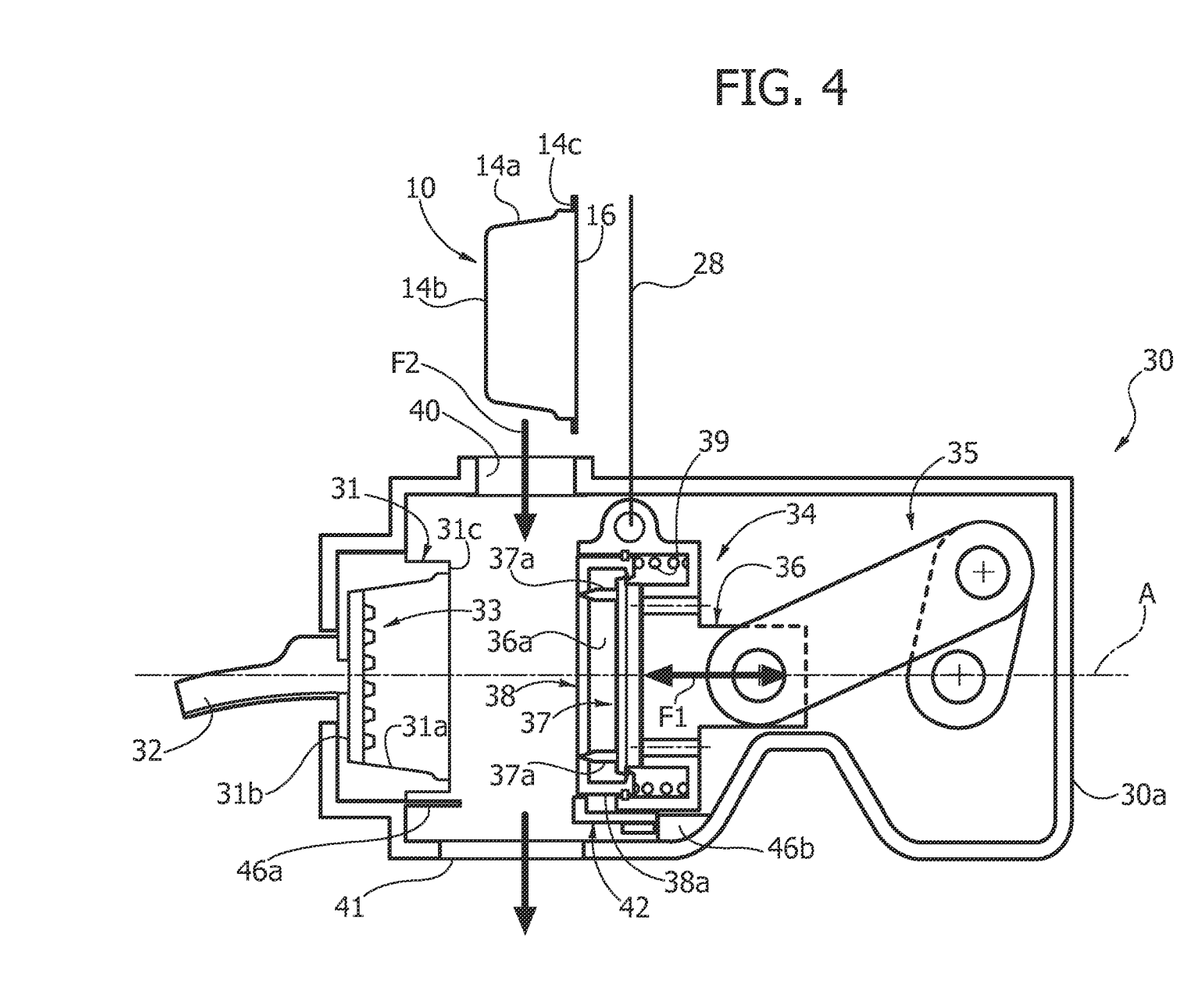
FIG. 4 is an enlarged detail of FIG. 3, regarding a delivery assembly according to the invention (cross section according to a vertical plane passing through the axis A)

Also with reference to FIG. 4, in various embodiments the delivery assembly 30 has a supporting structure 30a, which in FIGS. 3 and 4 is exemplified in the form of a frame, located in which is an infusion chamber 31, designed to house partially a cartridge 10, and to deliver the liquid product obtained by means of said cartridge, as will emerge hereinafter. The chamber 31, which substantially coaxial to the axis A, basically consists of a cup-shaped body, in a stationary position with respect to the structure 30a, having a side or peripheral wall 31a, which defines an inner surface of the chamber, which is substantially frustoconical, or has some other shape congruent with that of the side wall 14a of the cartridges 10 to be used in the machine 20.

The cup-shaped body of the chamber 31 then has a bottom wall 31b. In the example, the bottom wall 31b of the chamber 31 is plane or substantially plane, but in alternative embodiments it may be shaped like a concave vault, with concavity facing the inside or the outside of the cup-shaped body. The bottom wall 31b has at least one passage that sets the inside of the chamber 31 in fluid communication with a duct 32 for dispensing the liquid product that can be obtained by means of the cartridge 10, i.e., in the example considered here, an infusion of coffee.

In the example represented, associated to the bottom wall 31b is a perforating device 33, basically comprising one or more tips—preferably an array of tips—facing the inside of the chamber 31, in a direction substantially parallel to the axis A. In various embodiments, the tips in question (not indicated in the figures) can have a structure provided with one or more axial openings or grooves, designed to enable the liquid product prepared using the cartridge 10 to flow away, according to the modalities described more fully in what follows. Irrespective of the specific conformation of the aforesaid tips, the arrangement is such that the liquid that flows away from the cartridge 10, perforated at the bottom by the perforating device 33, can reach the dispensing duct 32 that traverses the bottom wall 31b. As has been said, on the other hand, the invention is applicable also to the case of dispensing assemblies for cartridges that have a previously perforated bottom wall, in which case it is not necessary to envisage the perforating device 33.

In its mouth part, the chamber 31 is limited by an annular head edge, designated by 31c.

The delivery assembly 30 further comprises an injector device, designated as a whole by 34 and referred to hereinafter for simplicity as "injector", designed to introduce into a cartridge 10 the pressurized fluid, supplied by means of the duct 28. The injector 34, substantially coaxial to the axis A, is mounted displaceable away from and towards a close-up position of coupling with the infusion chamber 31, for the purposes of preparation of a liquid product, as will emerge hereinafter. In the example represented, hence, the relative movement between the chamber and the injector is obtained by causing the injector to translate linearly with respect to the chamber.

For this purpose, the duct 28 is preferably a flexible pipe or hose, and the displacement of the injector 34 in the two opposite directions indicated by the arrow F1 is obtained by means of an actuation system, designated as a whole by 35. In various embodiments, such as the one exemplified hereinafter, the actuation system 35 comprises a substantially togglelike mechanism, which can, for example, be operated manually by a user via a purposely provided lever (not represented). The reciprocating displacement of the injector 34 according to the arrow F1 can in any case be obtained according to any modality known in the sector, for example, using a system actuated by a suitable electromechanical or hydraulic actuator (for example, a hydraulic cylinder of a known type, having a piston substantially coaxial to the axis A; a hydraulic cylinder of this sort can possibly be controlled via a pressure of water generated by the pump 23 itself).

In various embodiments, operatively associated to the injector 34 is a one-way valve (not represented), designed to open only when the pressure in the duct 28 has reached a given value. Such a valve can be integrated within the injector 34 or else be set outside it.

In the example represented, the injector 34 comprises a main body 36 connected to the actuation system 35, having a cavity 36a, preferably generally cylindrical, coaxial to the body itself, in its part facing the chamber 31. In the example, operatively housed inside the cavity 36a is a perforating device 37, mounted in a stationary position in the cavity 36a itself. Also the perforating device 37 basically comprises one or more tips—preferably an array of tips—facing the mouth of the chamber 31 and substantially parallel to the axis A. The tips in question, some of which are designated by 37a, can have, for example, a structure provided with at least one axial opening, similar to syringe needles, in order to enable supply of pressurized fluid into the cartridge 10, after perforation of the lamina 16 (FIGS. 1 and 2). Irrespective of the specific conformation of the body 36 and of the device 37, the arrangement is such that the pressurized fluid that is supplied by means of the duct 28 to the body 36 can, after perforation of the sealing lamina 16 of the cartridge, penetrate into the cartridge itself. As already explained, in any case the invention can be applied also to the case of dispensing assemblies provided for cartridges that have a previously perforated closing wall, in which case the presence of the perforating device 37 is not necessary.

The cylindrical cavity 36a is closed by a movable circular plate 38, coaxial to the axis A, provided with holes (not indicated) aligned or substantially coaxial to the tips 37a. In the non-limiting example illustrated, the plate 38 has a cylindrical wall 38a that is slidable in a fluid-tight way towards the inside of the chamber 36a, countered by the elastic reaction of a spring 39. For this purpose, in one embodiment the cavity 36a is shaped so as to define peripherally a seat for housing one end of the spring 39, the other end of which bears upon the leading end of the wall 38a of the plate 38. In the example, provided between the outer edge of the plate 38 and the peripheral surface of the chamber 36a is at least one sealing element, such as an annular gasket (not indicated).

The wall 38a of the plate defines arrests that are to co-operate with fixed arrests, fixed with respect to the main body 36 of the injector 34 or to the perforating device 37. The aforesaid arrests (not indicated), in addition to preventing the plate 38 from sliding out at the front from the cavity 36a, are sized and positioned in such a way that the front surface of the plate itself is held by the spring 39 substantially flush with the front edge of the main body 36 of the injector 34 (see, for example, FIG. 9).

The dimensions of the plate 38 with the corresponding wall 38a, of the cavity 36a and of the tips 37a are such that, when at rest, the plate 38 is held by the spring 39 in an advanced position, where each tip 37a engages, or is substantially coaxial to, a respective hole of the plate itself, but without coming out thereof. As will be seen hereinafter, instead, in a position of infusion or preparation of the liquid product, the thrust on the main body 36 of the injector 34 exerted by the actuation system 35 causes the perforating device 37 to be in an extracted condition, where the tips 37a project from the corresponding holes of the plate 38, following upon recession of the latter towards the inside of the cavity 36a, countering the action of the spring 39.

The delivery assembly 30 has a loading arrangement, aimed at enabling guided insertion, from above, of a cartridge 10 into the assembly itself.

The aforesaid loading arrangement includes an upper inlet duct 40, associated to or integral with the structure 30a of the assembly 30, said duct opening substantially in an intermediate area between the chamber 31 and the injector 34. The inlet duct 40 is shaped and has dimensions such as to enable introduction of a cartridge 10 in a direction of loading that is substantially vertical and perpendicular to the axis A (see arrow F2 in FIG. 4), with the corresponding lamina 16 facing the injector 34.

On the opposite side with respect to the inlet duct 40, the structure 30a has a lower outlet passage 41, for discharge from the assembly of the cartridge 10 when the latter is exhausted. In a way in itself known, the inlet duct 40 is shaped and has dimensions such as to guide a cartridge 10 with relative precision up to an area of retention, whilst the outlet passage 41 has wider dimensions than the former, to enable the cartridge 10 to fall freely by gravity out of the assembly 30.

The loading arrangement of the delivery assembly 30 is configured to receive the cartridge 10 from above, through the inlet duct 40, and then keep it in a retention position, substantially coaxial to the axis A, between the chamber 31 and the injector 34, with the corresponding lamina 16 substantially in contact or preferably only slightly spaced away from the front surface of the plate 38 of the injector 34.

For this purpose, the loading arrangement comprises retention means that are capable of assuming a condition of retention and a condition of release of a cartridge 10. Preferably, there are also provided guiding means, configured so as to guide the cartridge up to the aforesaid retention position.

As will emerge clearly hereinafter, in accordance with a preferential characteristic of the invention, switching of the retention means between the aforesaid two conditions is determined by the relative movement between the chamber 31 and the injector 34, in particular by the displacement of the injector with respect to the chamber.

In accordance with a preferential characteristic, the aforesaid retention means are carried by the injector 34 and can translate therewith. Preferably, moreover, the aforesaid switching between the conditions of retention and of release is determined by the mechanical interaction or interference of said retention means with fixed or stationary elements of the delivery assembly 30.

With particular reference also to FIGS. 5-9, in one embodiment the aforesaid retention means comprise a lower support element 42, designed to support the cartridge 10 from beneath; said element is mounted movable on the bottom part of the injector 34, i.e., the part facing the outlet duct 41.

In the embodiment illustrated (see in particular FIG. 7), the lower support element 42 has a substantially L-shaped plate-like body, with a vertical portion 42a and a horizontal portion 42b, the upper surface of which has a, preferably but not necessarily hemispherical, projection 43.

In the example illustrated, the horizontal portion 42b has two axial cuts, so as to define substantially three tabs, the central one of which, designated by 42c, is at least slightly flexible and provided with the projection 43. As may be seen in FIG. 9, the main body 36 of the injector 34 has, in a front region thereof, a seat 44—for example, constituted by a slit parallel to the axis A—in the area of which the horizontal portion 42b of the bottom support element 42 is linearly slidable. As may be noted, a lower surface of the main body 36, facing the horizontal portion 42b of the support 42, has a notch 45, where the projection 43 is designed to engage. Of course, a reverse arrangement is possible, with the notch 45 made on the element 42 and the projection 43 made on the wall of the body 36.

Figure 7:
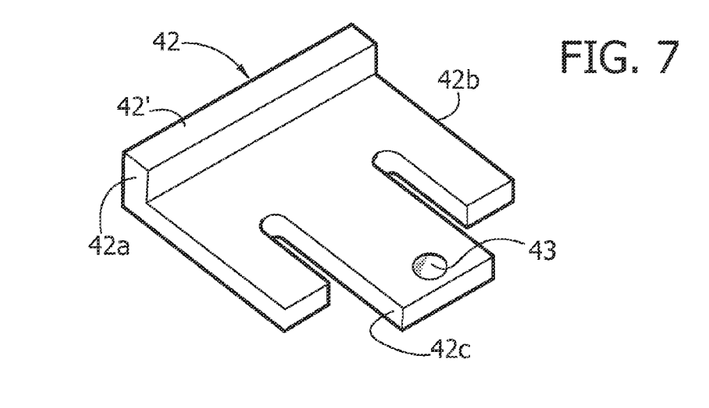
FIG. 7 is a schematic perspective view of a bottom retention element belonging to the delivery assembly of FIG. 4.

The vertical portion 42a of the support element 42 always remains on the outside of the seat 44, generally facing, on one side, the chamber 31 and, on the opposite side, a front edge of the body 36, appropriately provided with a recess in an area corresponding to the aforesaid vertical portion 42a. In the example, said vertical portion 42a is sized in such a way that its upper end, designated by 42' in FIG. 7, is substantially flush, horizontally, with respect to the peripheral surface of the plate 38 of the injector 34, as may be clearly seen in FIG. 9.

As will emerge clearly hereinafter, the front and back of the lower support element 42 may interfere mechanically with fixed parts of the assembly 30, in the course of a cycle of operation of the assembly itself. For this purpose, in the case exemplified, a first stop element is provided, designated by 46a (see FIG. 4), upon which the front end of the support 42 (its vertical portion 42a) can come to bear. Likewise, on the opposite side, a second stop element is provided, designated by 46b, on which the rear end of the support element 42 (i.e., of the tab 42c) can come to bear. In the example represented, the aforesaid stop elements 46a and 46b are integral with or fixed with respect to the structure 30a, but they can evidently be made or associated to other stationary parts of the delivery assembly 30 or of the machine 20.

As will emerge clearly hereinafter, the projection 43 and the notch 45 of the example form coupling means, here of a substantially snap-type—designed to keep—in a respective operative condition—the support element 42 in an advanced position in the course of the movement of approach of the injector 34 towards the chamber 31 so as to support the cartridge 10 at the bottom. Said coupling means can be switched between the aforesaid operative condition and a respective inoperative condition following upon mechanical interference between the support element 42 and the two stop elements 46a and 46b. It will be appreciated that, for this purpose, the aforesaid coupling means could have a configuration different from the one exemplified here: for example, the projection 43 could be replaced by a ball or other member forced by a spring, designed for engagement with the notch 45.

Figure 8:
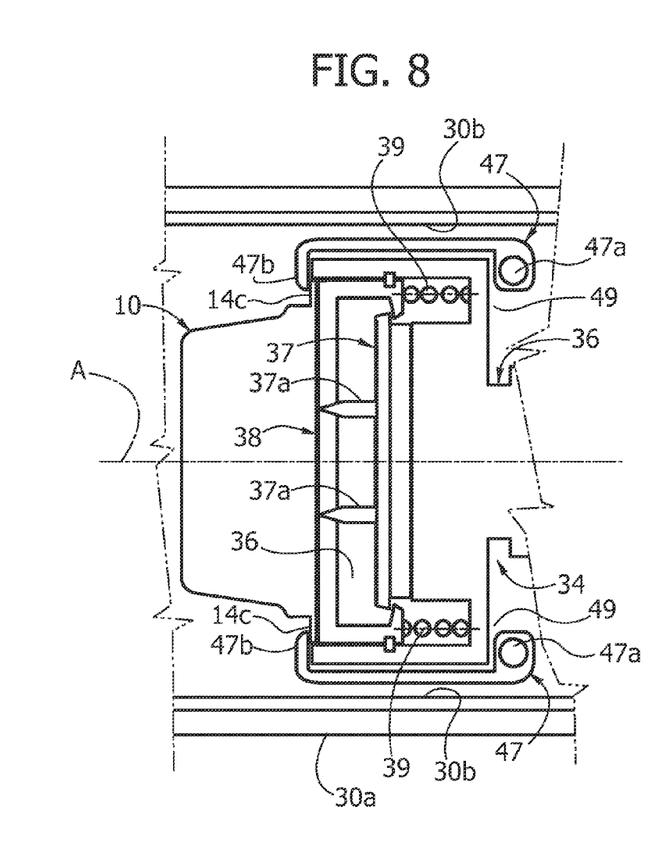
FIGS. 8 and 9 are enlarged details of FIGS. 5 and 6, respectively.

With particular reference to FIG. 8, in one embodiment the aforesaid guiding means comprise two lateral elements, designated by 47, hereinafter defined only for simplicity as "jaws". As it will result hereinafter, in fact, the jaws are not hinged or anyway swinging with respect to the injector 34 to be capable of assuming a closed condition and an open out condition: in the preferred embodiment of the invention, the jaws 47 are in a fixed position on the injector 34.

The jaws 47 are set substantially symmetrically on opposite sides of the axis A and are supported directly by the injector 34, substantially in cantilever fashion, so as to extend in length along the two opposite sides of the injector 34, i.e., substantially in the direction of the axis A. The jaws 47 are constrained, preferably in a rear region thereof, to a respective joint pin 47a, carried by the main body 36 of the injector 34.

The front regions of the jaws 47 each define at least one first appendage or tooth 47b, projecting in a radial direction, i.e., towards the axis A. The jaws 47 are shaped and sized in such a way that a rear face of the teeth 47b generally faces the front edge of the main body 36 of the injector 34 (see, for example, FIG. 8), at a short distance therefrom, as well as facing, for a short stretch thereof, also the front surface of the plate 38, at a slight distance therefrom. In the course of the step of loading of a cartridge 10 from above, the space existing between the aforesaid rear surface of the teeth 47b, on one side, and the main body 36 and the plate 38, on the other side, forms a sort of guide gap, in which the annular flange 14c of the cartridge 10 is able to penetrate to reach the aforesaid retention position where it is coaxial to the axis A.

Clearly, the shape shown for the guiding elements represented by the jaws 47 is not indispensable, provided that—for example—the guiding elements could have a different shape or be directly defined in the body of the injector 34; for example, the guiding means could comprise only the fixed teeth 47b, defined in or associated to the body 36 of the injector 34.

In use, a cartridge 10 is introduced from above into the inlet duct 40, according to the arrow F2 of FIG. 4 and pushed slightly downwards. Introduction is preferably manual, but may also be obtained by means of an automated mechanism, according to a technique in itself known.

Figure 5:
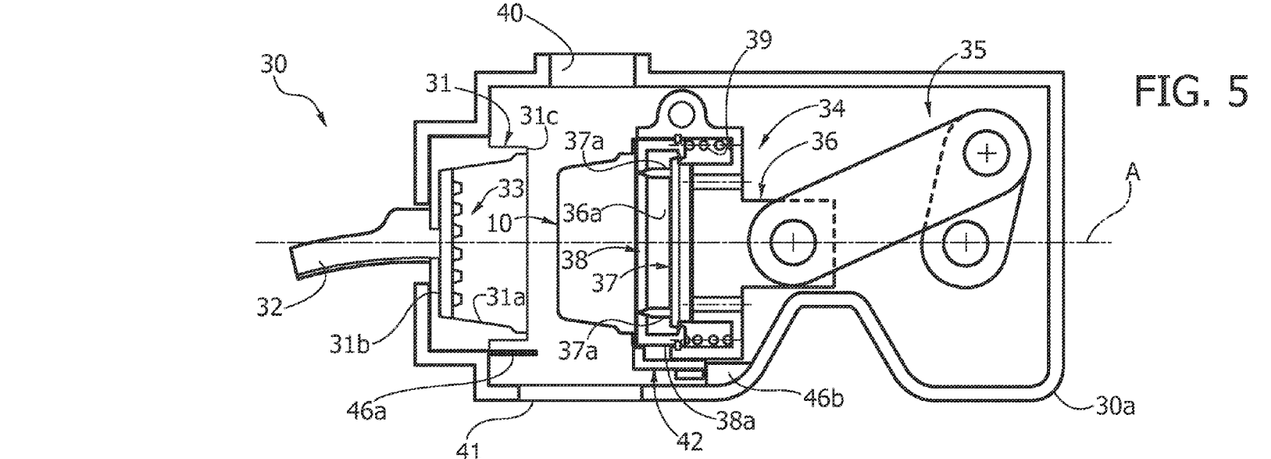
FIG. 5 is a schematic cross-sectional view, according to a vertical plane passing through the axis A of FIG. 4, with the delivery assembly in a condition of loading of a cartridge.
Figure 6:
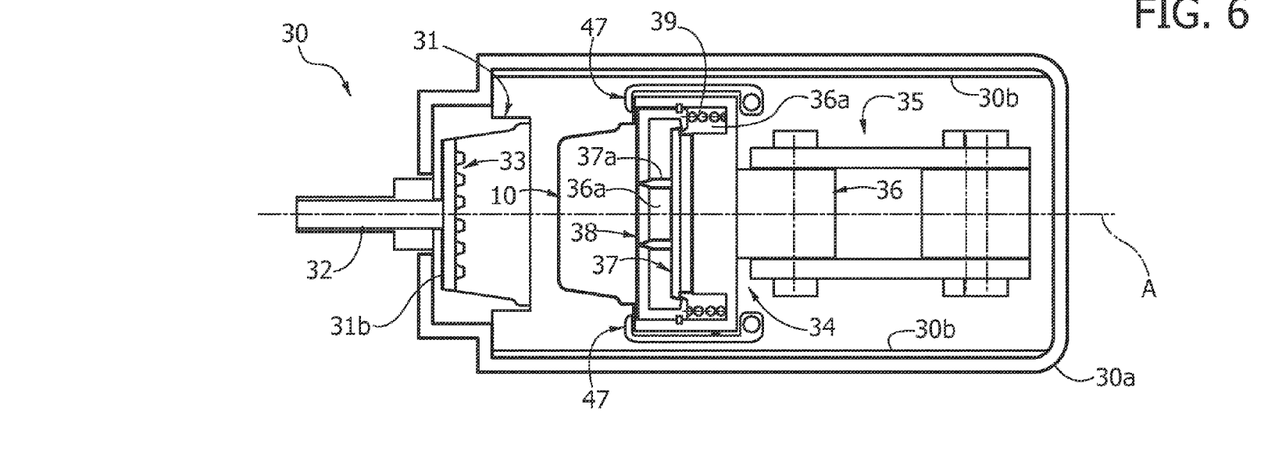
FIG. 6 is a partial schematic cross-sectional view, according to a horizontal plane passing through the axis A of FIG. 4, with the delivery assembly in the aforesaid condition of loading of a cartridge.

In the loading step, with the actuation system 35 inactive, the injector 34 is in a respective withdrawn position of loading, where the front of the injector itself is substantially flush with the inlet duct 40 (see, for example, FIGS. 4 and 5). In said condition, the lower support element 42 is positioned in such a way that its projection 43 is engaged in the corresponding seat 45 (see FIG. 9).

As previously explained, the inlet duct 40 is shaped and sized so as to guide the cartridge 10 with relative precision in its movement downwards. In this way, the cartridge 10 descends to the point where the outer edge of its flange 14c bears upon the upper surface of the vertical portion 42a of the lower support element 42, as may be seen, for example, in FIG. 8. In its movement downwards, the flange 14c of the cartridge penetrates into the gap existing between the teeth 47b of the jaws 47 and the front surface of the injector, in particular of its plate 38 (see FIG. 8).

In this way, the cartridge 10 is supported vertically by the lower support element 42 and constrained transversely by the jaws 47 in a position of loading or retention, where the cartridge 10 is generally coaxial to the axis A, with the sealing lamina close to or up against the front surface of the plate 38.

The cycle of operation of the machine envisages then actuation of the actuation system 35, which brings about advance of the injector 34 towards the chamber 31. In the course of advance, given the condition of engagement of the projection 43 in the corresponding seat 45 (see FIG. 9), the main body 36 of the injector 34 draws along with it the lower support element 42, which remains in its bottom position for supporting the cartridge 10.

As has been said, the jaws 47 are in a fixed position with respect to the body of the injector 34, and movable therewith: therefore, during the advancement of the injector 34 the jaws 47 continue to laterally constrain the cartridge 10.

At a certain point of advance, the cartridge 10 cannot penetrate further into the chamber 31. In various embodiments, it may be envisaged that the peripheral region of the bottom wall 14b of the cartridge 10 (see FIG. 2) bears upon the bottom wall 31b of the chamber 31 (FIG. 4) or on a peripheral region of the first perforating device 33 (FIG. 4) not provided with tips (for example, in the case of the bottom wall 14b with concavity as represented in FIG. 2) in such a way that the bottom of the cartridge is not perforated. In other embodiments, it is possible to envisage that the bottom wall of the cartridge bears upon the tips of the first perforating device 33 (FIG. 4) without this leading to a substantial perforation or tearing of the bottom, or that the bottom wall comes to find itself at a short distance from said tips. This can be obtained by appropriately sizing the cup-shaped body of the chamber 31, and in particular the height of its front edge 31c (FIG. 4)

upon which the flange 14c of the cartridge bears (FIG. 2). In other embodiments it may again be envisaged that, once the position of arrest of the cartridge 10 within the chamber 31 is reached, the bottom of the former is already perforated by the tips of the perforating device 33 of FIG. 4.

Irrespective of the practical embodiment chosen, as has been said, at a certain point of advance of the injector 34 the cartridge 10 cannot penetrate further into the chamber 31. The injector 34 continues in any case to advance, and this causes yielding of the spring 39 (FIG. 4), and then recession of the plate 38 bearing upon the lamina 16 of the cartridge 10. Said recession, and the simultaneous advance of the main body 36 of the injector 34, has the consequence that the tips 37a of the second perforating device 37 (FIG. 4) come out of the corresponding holes of the plate 38 and perforate the lamina 16 of the cartridge, up to a position of maximum advance of the injector 34 (see FIGS. 12 and 13). Once said position is reached the actuation system 35 is no longer active. As may be noted, in particular from FIG. 13, the outer profile of the body defining the chamber 31 is preferably shaped so as to enable in any case the passage of the jaws 47 without any interference or significant interference during the advancement, that is with the teeth 47b that go beyond the front edge 31c without enter into contact therewith, for the purpose of attaining the aforesaid position of maximum advance. For this purpose, in the example, the front part of the cup-shaped body of the chamber 31—which defines the front edge 31c (FIG. 4)—has a restricted diameter, i.e., smaller than that of the flange of the cartridge 10. As an alternative, the cup-shaped body may be provided with axial grooves capable of receiving the part of the jaws that frontally projects from the injector 34, here represented by the teeth 47b, when such a part goes beyond, while advancing, the front edge 31c of the chamber 31.

Figure 9:
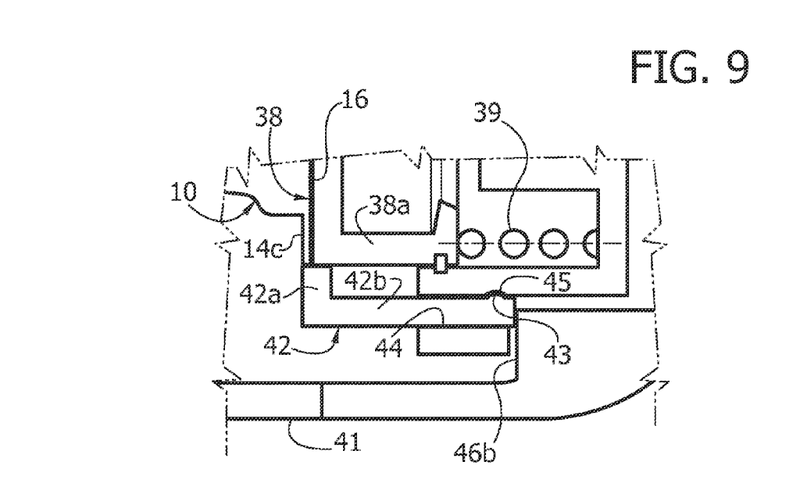
Figure 12:
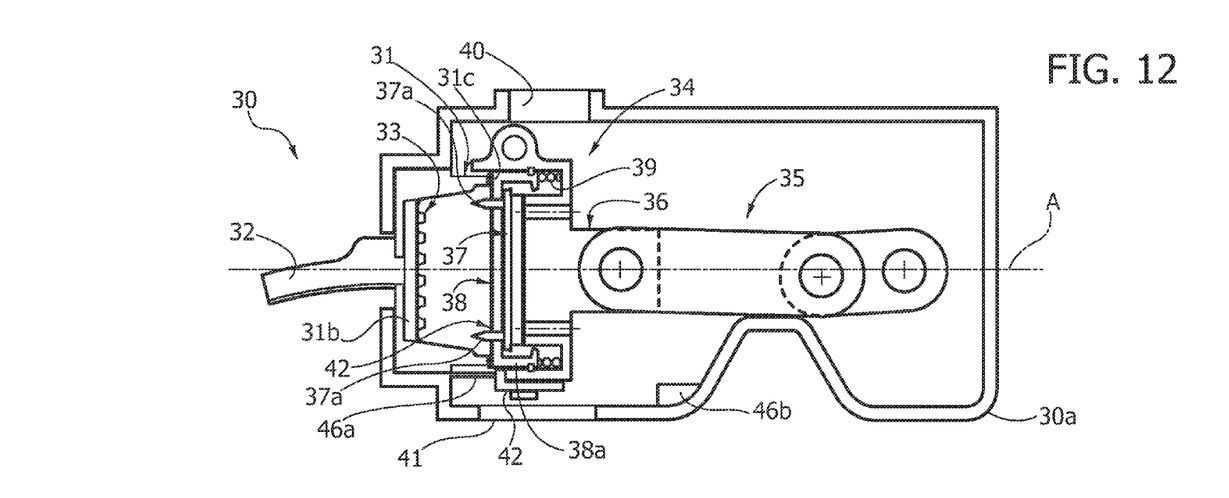
FIGS. 12 and 13 are views similar to those of FIGS. 5 and 6, respectively, with the delivery assembly in a condition of infusion.
Figure 13:
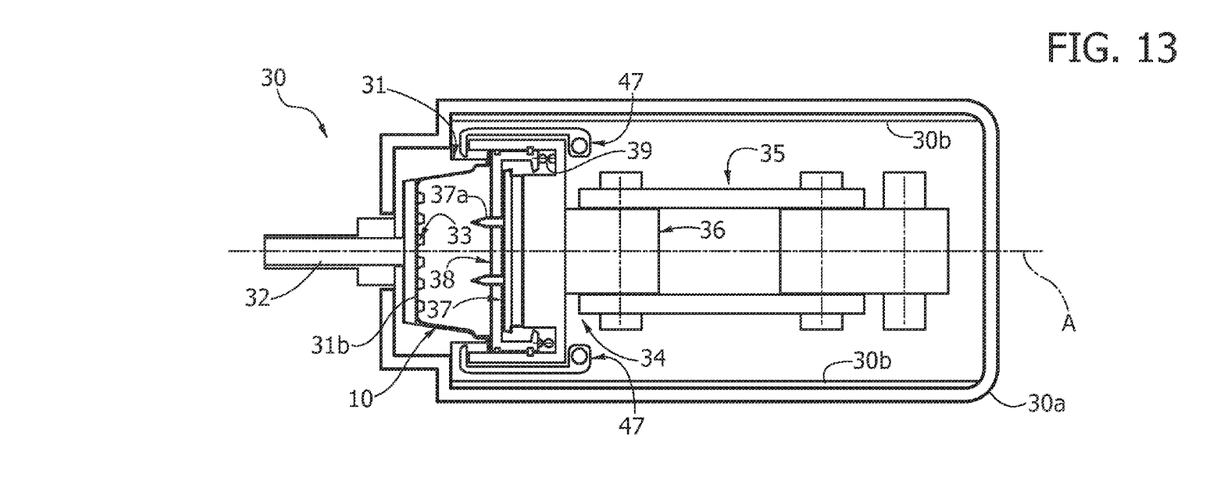

It should be noted that, shortly before the position of FIGS. 12 and 13 is reached, the front end of the support element 42 comes to bear upon the stop element 46a (FIG. 4). Further advance of the injector 34 thus causes sliding of the support element 42 in the corresponding seat 44, with the consequent disengagement of the projection 43 from the corresponding notch 45 (FIG. 9). In effect, as may be seen, for example, in the detail of FIG. 14, the support element 42 moves back with respect to the front surface of the plate 38 of the injector 34. In said position, the cartridge 10 is no longer supported vertically by the support element 42, but is in any case supported by the chamber 31 and kept within the latter by means of the injector 34.

Via the action of the pump 23 (FIG. 1), the pressurized fluid is next forced into the cartridge 10, perforated by means of the tips 37a of the second perforating device in order to obtain the infusion with the powdered product (coffee, in the example considered) contained in the cartridge 10. It should be noted that the plate 38 is preferably configured, in a way in itself known, to provide fluid tightness with respect to the lamina 16, in the course of introduction into the latter of the pressurized fluid. In the case where the bottom of the cartridge 10 had already been previously perforated by the tips of the first perforating device 33, the liquid product generated by the infusion can flow away through the dispensing duct 32 towards a collecting container. In other embodiments—and as has already been mentioned above—it may be envisaged, instead, that, at the start of injection of the pressurized fluid into the cartridge 10, the bottom of the latter has not yet been perforated. In said embodiments, following upon start of injection of the fluid, the pressure that is set up within the cartridge 10 causes its bottom to start to undergo deformation and be pushed against the tips of the perforating device 33, until the perforation that enables the liquid product to flow towards the dispensing duct 32 is obtained.

The pump 23 that sends the hot water under pressure into the cartridge 10 is then deactivated, for example, manually, and a step of discharge of the cartridge 10 can be started. For this purpose, the actuation system 35 is operated to bring the injector 34 back into the initial position of FIGS. 5 and 6.

Figure 11:
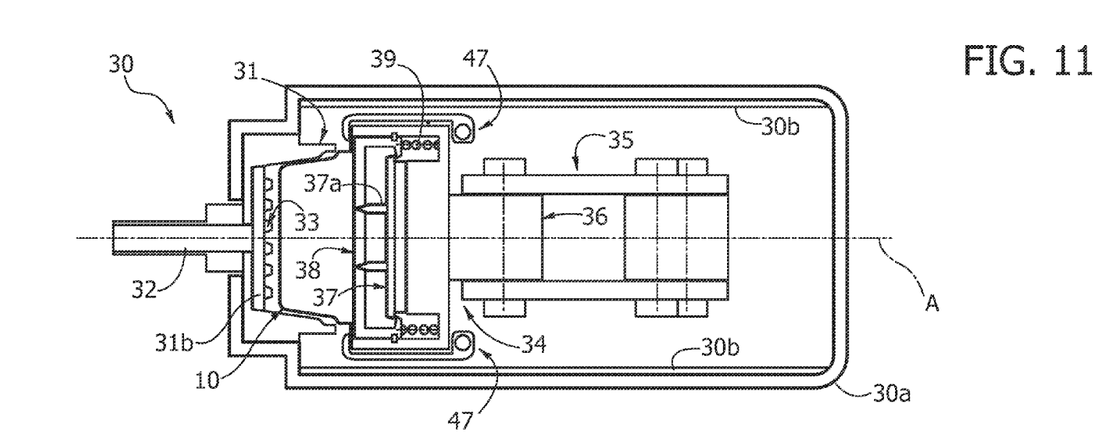

At a certain point of recession of the injector 34 the jaws 47—and precisely the corresponding teeth 47b—return into contact with the flange 14c of the cartridge 10 so as to start, following upon said recession, extraction of the cartridge from the chamber 31 (said condition basically resembles the one visible in FIG. 11). In the meantime, thanks to the action of the spring 39 inside the injector (FIG. 4), the cartridge 10 is pushed progressively by the plate 38 towards the chamber 31, thus causing exit of the tips 37a from the lamina 16 of the cartridge.

Figure 10:
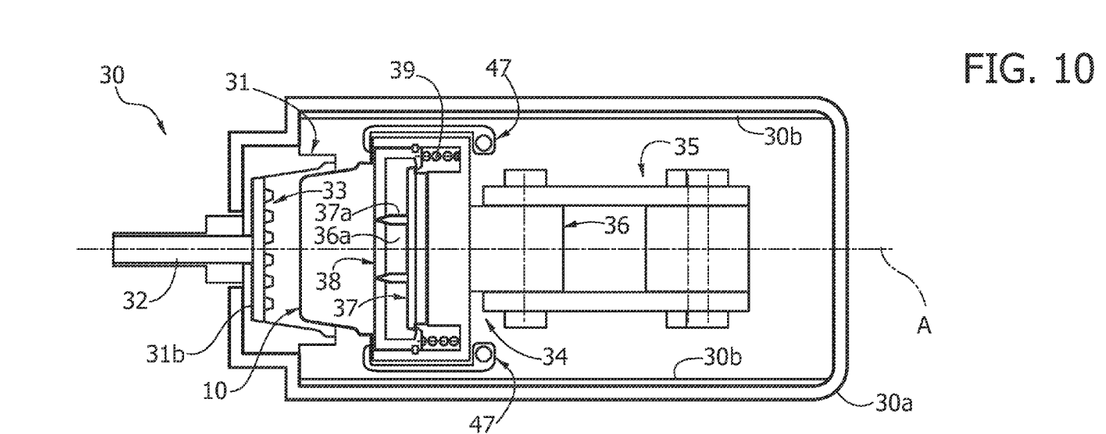
FIGS. 10 and 11 are views similar to those of FIG. 6, regarding two different positions assumed by an injector device in the course of operation of the delivery assembly of FIG. 4.

Next, a condition basically resembling the one visible in FIG. 10 is reached: the cartridge 10 is no longer supported vertically by the lower support element 42 and is thus free to fall by gravity towards the outlet passage 41, anyway guided in such movement by the jaws 47.

Figures 14, 15:
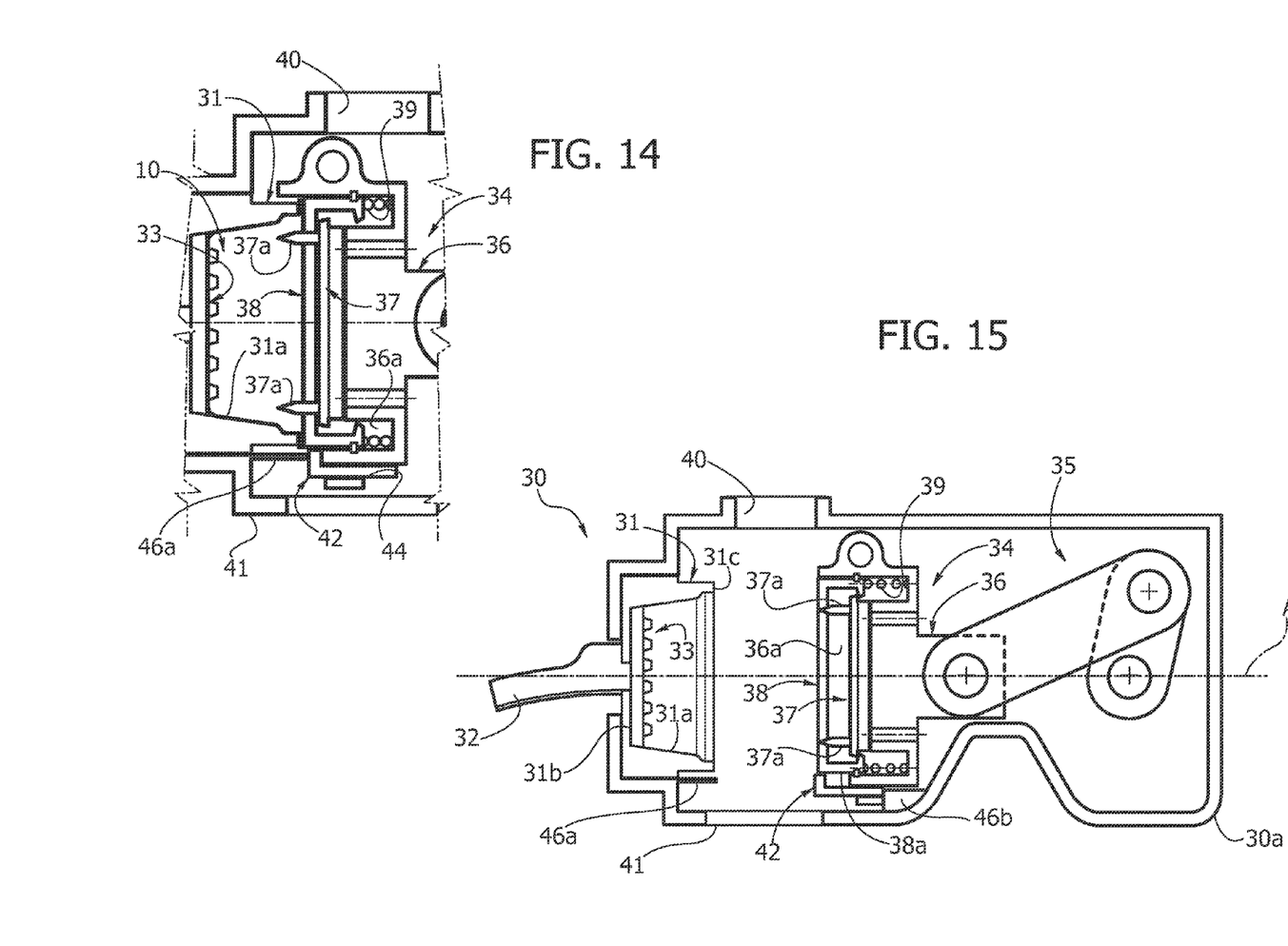
FIG. 14 is an enlarged detail of FIG. 12.
FIG. 15 is a view similar to that of FIG. 5, with the delivery assembly in an end-of-cycle position.

Recession of the injector 34 proceeds until the initial condition of the cycle is reached (illustrated in FIG. 15). Shortly before reaching the final condition of FIG. 15, the rear region of the lower support element 42 comes to bear upon the stop element 46b (see FIGS. 4 and 9). The subsequent further recession of the injector 34 thus causes a further sliding of the support element 42 in the corresponding seat 44, opposite to the previous one, up to engagement of the projection 43 in the corresponding notch 45. In this way, the support element 42 advances with respect to the front surface of the plate 38 of the injector 34, returning to the starting position (visible in FIGS. 9 and 15), with the corresponding vertical portion 42 an in an operative position for supporting a new cartridge 10 vertically.

The assembly 30 according to the invention is simple to produce, reliable and compact. In the assembly 30, the support of the cartridge 10, following upon its loading and in the course of its advance towards the infusion chamber 31, is provided by the lower support element 42, the jaws 47 performing in this steps basically functions of guide and lateral constraint of the cartridge itself. In this way the jaws 47 can have very reduced dimensions and do not require any driving arrangement or elastic elements, being the jaws in a fixed position on the injector 34. Also the lower support element 42 has a minimum bulk and does not require any complicated actuation system and/or including elastic elements.

Without prejudice to the principle of the invention, the details of construction and the embodiments may vary, even significantly, with respect to what has been illustrated herein purely by way of non-limiting example, without thereby departing from the scope of the invention, as defined by the annexed claims.

As already pointed out, the perforation of the bottom wall 14b, instead of occurring following upon introduction of a pressurized fluid into the cartridge 10, can also intervene "cold" following upon an action of perforation by the tips of the bottom perforating device 33, before, together with, or after perforation of the sealing lamina 16 by the tips 37a of the top perforating device 37, even before inflow of fluid into the cartridge 10 occurs.

As already mentioned, in any case, the cartridges that can be used in the machine provided with the assembly according to the invention can also be of the type where the bottom of the corresponding body has one or more pre-formed passages, which are also closed by a filtering or impermeable film but designed to tear once a given pressure in the cartridge itself is reached. For such a case the infusion chamber 31 can evidently be without the corresponding perforating device 33.

The body 36 of the injector 34, the perforating device 37, and the plate 38 may of course have shapes different from those exemplified in the figures, without this adversely affecting their function.

The invention claimed is:

1. A delivery assembly for a machine for preparing liquids product by means of cartridges which have a substantially cup-shaped body that houses an amount of at least one substance capable of forming a liquid product through water and/or steam, the delivery assembly having a substantially horizontal axis and including
    an inlet passage, to enable a cartridge to be inserted in the delivery assembly,
    an injector device, to let water and/or steam under pressure in the cartridge,
    an infusion chamber, facing the injector device and capable of receiving one said cartridge,
    retention means, capable of maintaining the cartridge in a position substantially coaxial to the infusion chamber and the injector device,
    an actuation system, capable of causing relative displacements between the injector device and the infusion chamber, between a spaced position and a close position, the infusion chamber being in a fixed position with respect to a stationary structure of the delivery assembly and the injector device being mounted displaceable with respect to the infusion chamber and the said stationary structure,
    wherein the retention means are capable of assuming a retention position, in which the cartridge is retained in the said position substantially coaxial to the infusion chamber and the injector device, and a release position, in which the cartridge is free to fall towards an outlet passage of the delivery assembly,
    wherein the retention means comprise
    a support element for supporting the cartridge, the support element being sustained in a displaceable way by the injector device in a part thereof that generally faces towards the outlet passage, the support element being switchable from the said retention position to the said release position in the course of the displacement of the injector device towards the said close position; and
    guiding means in a fixed position at generally opposite side parts of the injector device, the guiding means frontally protruding from the injector device and being capable of laterally constraining the cartridge and guide it to said position substantially coaxial to the infusion chamber.

2. The assembly according to claim 1, wherein the guiding means comprises two generally opposite guiding elements, each guiding element having a portion of which generally faces a front of the injector device, in a gap between the said portion and the said front being receivable an annular flange of the cartridge.

3. The assembly according to claim 1, wherein the infusion chamber is defined by a corresponding body having a front edge, the body of the infusion chamber being shaped for enabling passage of the guiding means beyond said front edge, to the outside of the infusion chamber, during displacement of the injector device towards said close position.

4. The assembly according to claim 1, wherein the support element is switchable from the said retention position to the said release position by means of mechanical interaction or interference thereof with respect to fixed elements of said stationary structure of the delivery assembly.

5. The assembly according to claim 4, wherein the support element is mounted on a body of the injector device to be displaceable between a forward position and a withdrawn position, to which the respective retention and release positions correspond, respectively, and wherein the support element is capable of mechanically interfering with a first stop element and a second stop element, in such a way that the passage from the said forward position to said withdrawn position is caused by the mechanical interference of a generally front region of the support element with the first stop element, in the course of an approaching movement of the injector device towards the infusion chamber, and the passage from the said withdrawn position to the said forward position is caused by the mechanical interference of a generally rear region of the support element with the second stop element, in the course of a movement of the injector device away from the infusion chamber.

6. The assembly according to claim 5, wherein the said body of the injector device and the support element comprises coupling means, capable of maintaining—in a respective operative condition—the support element in the said forward position in the course of said approaching movement of the injector device towards the infusion chamber, the coupling means being switchable from between the said operative condition and a respective inoperative condition following said mechanical interference between the support element and the said first stop element and second stop element.

7. The assembly according to claim 6, wherein the coupling means are snap-switchable coupling means.

8. The assembly according to claim 1, wherein the support element has a bearing surface, for an annular flange of the cartridge.

9. The assembly according to claim 2, wherein the guiding elements are each fixed to a connection which is borne by the injector device.

10. The assembly according to claim 2, wherein the guiding elements are defined by a body of the injector device.

11. A machine for preparing liquid products via cartridges, comprising a delivery assembly according to claim 1.

12. A system for preparation of a liquid product, comprising
    a machine which includes a delivery assembly (30) according to claim 1, and
    a cartridge containing a dose of at least one substance capable of forming a liquid product via water and/or steam, the cartridge having a cartridge body which comprises a side wall, a bottom wall which closes the cartridge body at a first end of the side wall and an upper wall which closes the cartridge body at the second end of the side wall, wherein the side wall has an annular flange at the second end thereof,
    wherein, in the use on the machine, the annular flange of the cartridge body is laterally constrained by the guiding means and sustained at the bottom by the support element of the delivery assembly.

13. A method for preparing a liquid product comprising the steps of:
    providing a machine for preparation of liquid products comprising a delivery assembly (30) according to claim 1;
    providing a cartridge containing a dose of at least one substance capable of forming a liquid product via water and/or steam, the cartridge having a cartridge body which comprises a side wall, a bottom wall which closes the cartridge body at a first end of the side wall and an upper wall which closes the cartridge body at the second end of the side wall, wherein the side wall has an annular flange at the second end thereof, inserting the cartridge in the delivery assembly when the injector device is in said spaced position, in such a way that the annular flange of the cartridge body penetrates between the guiding means and a front of the injector device, to be laterally guided until an edge of the annular flanges comes to rest on the lower support element in the respective forward position;

bringing the injector device in said close position and injecting via it a fluid, such as water and/or steam, into the cartridge for preparing the liquid product, wherein during displacement of the injector device from the spaced position to the close position the guiding means remain in a fixed position relative to the injector device, for laterally constraining the annular flange of the cartridge, and the support element mechanically interferes with the first stop element of the stationary structure for passing in the respective withdrawn position;

discharging the liquid product from the cartridge with the injector device in said close position; and returning the injector device in said spaced position, wherein during displacement of the injector device from the close position to the spaced position the guiding means remains in a fixed position relative to the injector device for extracting the cartridge from the infusion chamber and subsequently enabling falling thereof towards a discharge passage of the delivery assembly, and the support element mechanically interferes with the second stop element of the stationary structure to go back to the respective forward position.

14. The assembly according to claim 1, wherein the guiding means are in a fixed position at generally opposite side parts of the injector device in substantially diametrically opposite positions.

* * * * *